United States Patent
McDonald et al.

(10) Patent No.: US 6,473,270 B1
(45) Date of Patent: Oct. 29, 2002

(54) ACTUATOR SHOCK SNUBBER

(75) Inventors: Ted Randal McDonald, Louisville, CO (US); Frederick Frank Kazmierczak, Erie, CO (US); Ryan Andrew Sievers, Longmont, CO (US); Jeff Gerard Barina, Loveland, CO (US); Robert Terry Haas, Longmont, CO (US); Russel Edward Rock, Longmont, CO (US); Bruce L. Blakeslee, Golden, CO (US)

(73) Assignee: Seagate Technologies LLC, Scotts Valley, CA (US)

( * ) Notice: Subject to any disclaimer, the term of this patent is extended or adjusted under 35 U.S.C. 154(b) by 0 days.

(21) Appl. No.: 09/515,576

(22) Filed: Feb. 29, 2000

Related U.S. Application Data
(60) Provisional application No. 60/150,713, filed on Aug. 25, 1999.

(51) Int. Cl.[7] .............................. G11B 21/08; G11B 5/55
(52) U.S. Cl. .................................................. 360/265.1
(58) Field of Search .......................... 360/265.1, 254.8, 360/254.7, 254.4, 254.3, 254.2, 254, 250, 240, 265.9, 255.7, 255.6, 255.3, 255.2, 255.1, 97.01, 97.02

(56) References Cited

U.S. PATENT DOCUMENTS

| | | | |
|---|---|---|---|
| 4,641,152 A | 2/1987 | Fedder et al. ............... 346/137 |
| 4,939,611 A | 7/1990 | Connolly ..................... 360/128 |
| 5,239,431 A * | 8/1993 | Day et al. ................. 360/98.08 |
| 5,453,889 A | 9/1995 | Alt ........................... 360/97.01 |
| 5,640,290 A | 6/1997 | Khanna et al. ........... 360/97.01 |
| 5,757,587 A * | 5/1998 | Berg et al. ................ 360/254.7 |
| 5,801,899 A | 9/1998 | Genheimer ............... 360/97.01 |
| 5,825,576 A * | 10/1998 | Kamerbeek .............. 360/254.2 |
| 5,838,517 A | 11/1998 | Frater et al. ............. 360/245.7 |
| 5,844,754 A | 12/1998 | Stefansky et al. ........ 360/266.1 |
| 5,870,259 A | 2/1999 | Alt et al. ..................... 360/255 |
| 5,926,347 A * | 7/1999 | Kouhei et al. ............ 360/254.3 |
| 5,959,807 A | 9/1999 | Jurgenson ................ 360/245.7 |
| 5,987,733 A | 11/1999 | Goss ......................... 29/603.03 |
| 6,005,747 A | 12/1999 | Gilovich ................... 360/98.07 |
| 6,028,745 A * | 2/2000 | Nguyen et al. ........... 360/254.3 |
| 6,067,209 A * | 5/2000 | Aoyagi et al. ............ 360/245.3 |
| 6,115,214 A * | 9/2000 | Allsup et al. ............... 360/128 |
| 6,301,073 B1 * | 10/2001 | Gillis et al. .............. 360/254.8 |
| 6,341,051 B2 * | 1/2002 | Hachiya et al. .......... 360/265.1 |

FOREIGN PATENT DOCUMENTS

| | | |
|---|---|---|
| EP | 0915454 A1 | 12/1999 |
| JP | 10-241310 A * | 9/1998 |
| JP | 11120729 | 4/1999 |

* cited by examiner

Primary Examiner—Hoa T. Nguyen
Assistant Examiner—Julie Anne Watko
(74) Attorney, Agent, or Firm—Kirstin Stoll-DeBell; Merchant & Gould P.C.

(57) ABSTRACT

An apparatus and method for reducing deflection of an actuator assembly within a head disc assembly in a disc drive during a mechanical shock event. A snubber is fastened to a stationary portion of the head disc assembly and has a snubber body and two or more snubber arms connected to the snubber body. The adjacent snubber arms form slots therebetween. A portion of the actuator assembly may be inserted into each of the slots whereby the snubber arms will reduce the deflective movement of the actuator assembly during a mechanical shock event.

14 Claims, 4 Drawing Sheets

ACTUATOR SHOCK SNUBBER

RELATED APPLICATIONS

This application claims the benefit of priority of U.S. Provisional Patent Application Ser. No. 60/150,713 entitled "ACTUATOR AND HGA SHOCK SNUBBER," filed Aug. 25, 1999.

FIELD OF THE INVENTION

This application relates generally to the field of disc drive storage devices, and more particularly, to an apparatus and method for mitigating shock and reduce damage to the actuator assembly and other components in the disc drive.

BACKGROUND OF THE INVENTION

Disc drives are data storage devices that store digital data in magnetic form on a rotating storage medium, such as a disc. Modern disc drives comprise one or more rigid discs that are coated with a magnetizable medium and mounted on the hub of a drive motor for rotation at a constant high speed. Information is stored on the discs in a plurality of concentric circular tracks typically by an array of transducers ("heads") each mounted on a slider. Each slider is supported on a flexure attached to an actuator arm which is part of an actuator assembly that moves the head relative to the discs. Each transducer, e.g., a magnetoresistive read or write head, is used to transfer data between a desired track and an external environment. During a write operation, the write head writes the data onto the disc track, and during a read operation, the read head senses the data previously written on the disc track and transfers the information to a disc drive circuit board in the external environment.

The slider with the heads are mounted via flexures at the end of an actuator arm that projects radially outward from an actuator body in the actuator assembly. The actuator body pivots about a bearing assembly mounted on a base plate at a position closely adjacent to the outer extreme of the discs. The head(s) read data and transfer it through conductors on the actuator arm to a preamplifier which amplifies the signals coming from the heads.

Typically, the actuator assembly includes a voice coil motor to position the heads with respect to recording tracks on the disc surfaces. The actuator voice coil motor includes a coil mounted to the actuator body opposite the actuator arm and is immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body and arm pivot about the bearing assembly and the heads move across the disc surfaces. When the disc drive is stationary, the voice coil motor pivots the actuator arm, flexure, and slider away from the disc and parks the slider on a load ramp attached to the base plate adjacent to the outer diameter of the disc. Alternatively, the slider may be parked in a loading zone on the outer perimeter of the disc.

The flexure includes a load beam and a gimbal insert. One end of the load beam is attached to an end of the actuator arm opposite of the actuator body. The other end of the load beam is connected to the gimbal insert. The gimbal insert in turn is attached to and supports the slider. The physical connection between the gimbal insert and the load beam is essential for maintaining a slider flying height which will allow the heads to read and write data to and from the disc.

Mechanical shock events caused by an impact to a computer may cause permanent damage to a hard disc drive. Shock events often cause damage to the flexure and associated slider. Specifically a shock event which occurs while the disc is stationary causes deflection of the actuator arm and attached flexure which in turn may cause elements of the actuator assembly to be permanently damaged such that the recording heads loose their ability to function.

SUMMARY OF THE INVENTION

Against this backdrop the present invention has been developed to solve the above and other problems by using a snubber in a disc drive to reduce deflective movement of the actuator assembly.

A head disc assembly in a disc drive has a base plate and a top cover which encloses a drive motor, a disc supported thereon, and an actuator assembly. The actuator assembly has an actuator arm attached to one end of a flexure, and a slider or read/write head attached proximate to an opposite end of the flexure. A snubber is fastened to a stationary portion of the head disc assembly and has a snubber body and two or more snubber arms connected to the snubber body. The adjacent snubber arms form slots therebetween. As the actuator assembly pivots towards an outer diameter of the disc, a portion of the actuator assembly is inserted into each of the slots. While the actuator assembly is located within the slots, the snubber arms reduce the deflective movement of the actuator assembly during a mechanical shock event. By reducing the deflective movement, the chances of permanently damaging the actuator assembly and other disc drive components are likewise reduced.

These and various other features as well as advantages which characterize the present invention will be apparent from a reading of the following detailed description and a review of the associated drawings.

DETAILED DESCRIPTION

Figure 1:
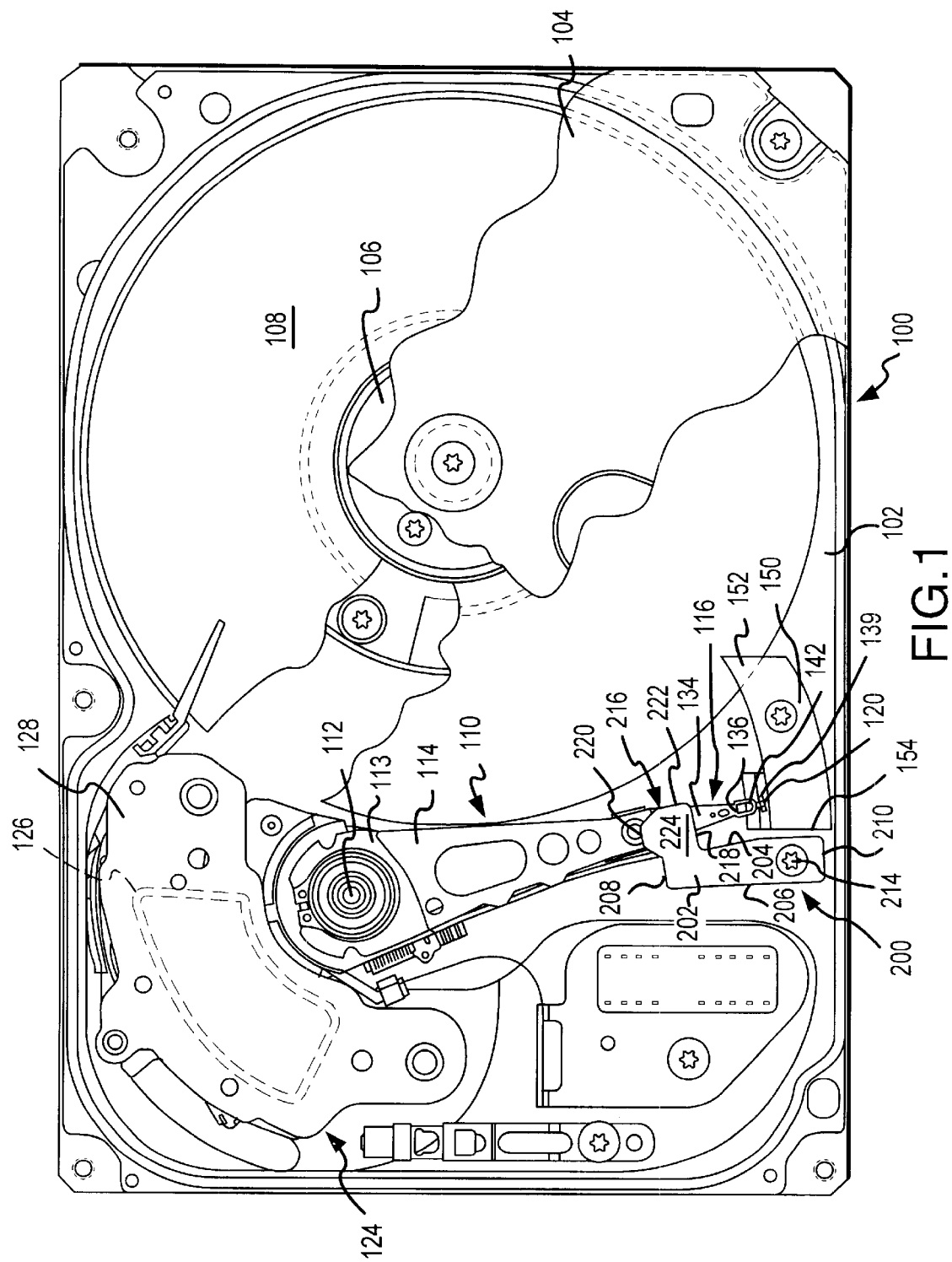
FIG. 1 is a plan view of a disc drive head disc assembly with the cover partially broken away which incorporates a snubber in accordance with one preferred embodiment of the invention with the head disc assembly.

FIG. 1 shows a disc drive 100 with a snubber 200 constructed in accordance with one preferred embodiment of the present invention. The snubber 200 is fastened to a stationary portion of a head disc assembly. Preferably, the snubber 200 is formed from a rigid material with damping properties, such as plastic, but a non-damping material like aluminum or other metal may be used. The snubber 200 includes a snubber body 202 and one or more snubber arms 216. A slot 230 may be formed between every two adjacent snubber arms 216, between a base plate 102 and an adjacent snubber arm 216, and between a metal top cover 104 and an adjacent snubber arm 216. The slots 230 are adapted to receive an actuator arm 114 or a flexure 116 when an actuator assembly 110 is parked and/or when the disc drive 100 is not in operation. The number snubber arms 216 may depend upon the number of discs 108 or the number of actuator arms 114 and flexures 116 in the disc drive 100. During a mechanical shock event, the vibrating actuator assembly 110 makes contact with the snubber arms 216 which reduce the deflection or vibration to thereby minimize the risk of permanent damage to the disc drive 100.

Various other components of the disc drive 100 are mounted to the base plate 102. The top cover 104 cooperates with the base plate 102 to form an internal, sealed environment for the disc drive components in a conventional manner. The components include a drive motor 106 which rotates the discs 108 at a constant high speed. Information is written to and read from tracks on each of the discs 108 through the use of an actuator assembly 110, which rotates about a bearing shaft assembly 112 positioned adjacent the discs 108. The actuator assembly 110 includes an actuator body 113, or E-Block, having one or more actuator arms 114, which extend towards the discs 108, with one or more flexures 116 extending from each actuator arm 114. Mounted at an end of each of the flexures 116 opposite the actuator arm 114 is a head slider or "read/write head" 120 including one or more read and/or write heads 118. The head slider 120 enables the heads 118 to fly in close proximity (or at a "flying height") above the corresponding surface of the associated disc 108. The flying height is a height at which the heads can read from and write data onto a disc while not touching the disc surface.

The radial position of the slider 120 and its heads 118 are controlled through the use of a voice coil motor (VCM) 124. The VCM 124 typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

Each of the flexures 116 includes a load beam 134 and a gimbal insert 142. The load beam 134 has a distal end 136 positioned near the slider 120 and an opposite end (not shown) which is attached to the actuator arm 114. The gimbal insert 142 is connected to the distal end 136 of the load beam 134. The gimbal insert 142 is also attached to the load beam 134 at a point between the slider 120 and the actuator arm 114. The slider 120 is mounted to the gimbal insert 142 in close proximity to the distal end 136 of the load beam 134.

Figure 2:
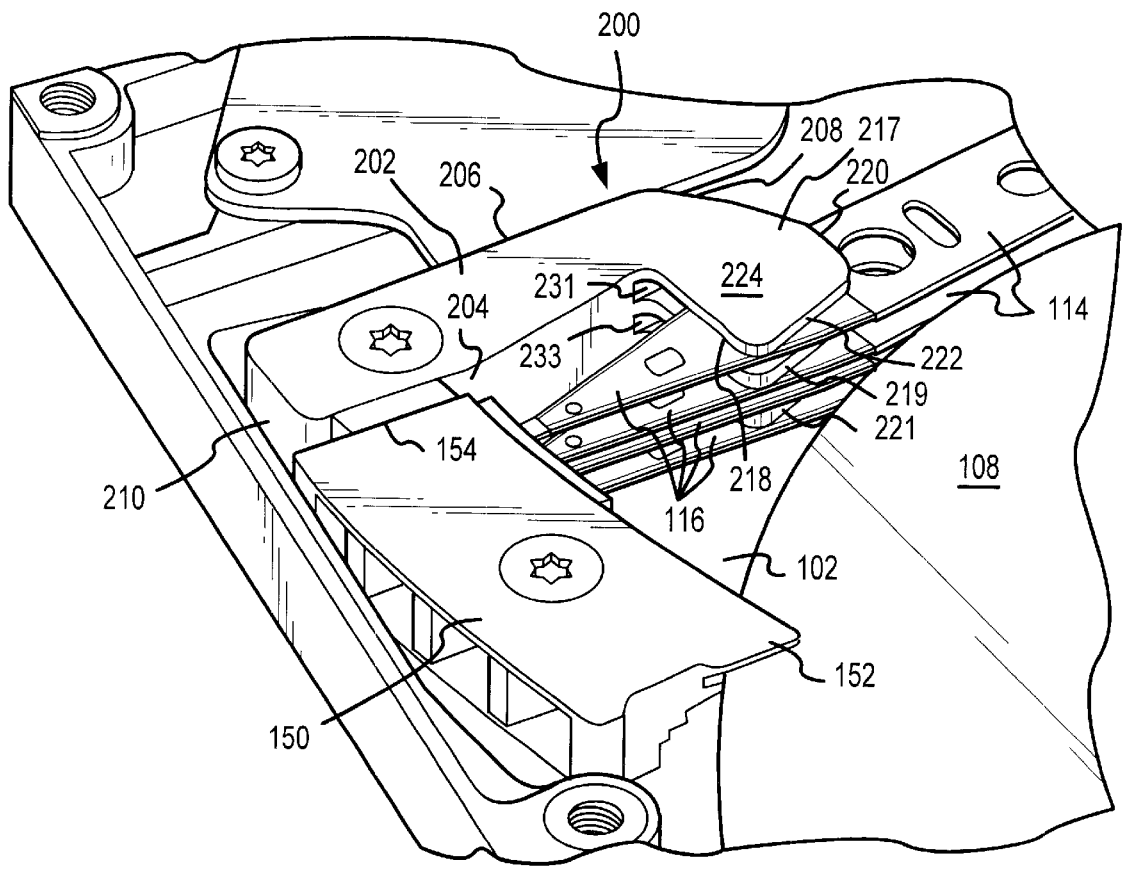
FIG. 2 is top partial perspective view of the snubber shown in FIG. 1.

A load ramp 150 is attached to the base plate 102 at a point adjacent to the outer diameter of the disc 108. One end 152 of the load ramp partially overlaps the outer diameter 109 of the disc 108. When the disc 108 is stationary, the actuator assembly 110 pivots such that the slider 120 moves towards the outer diameter 109 of the disc 108 until a ramp arm 139 located at the distal end 136 of the load beam 134 makes contact with the load ramp 150. The ramp arm 139 slides into the load ramp 150 until it reaches a parked position as shown in FIGS. 1 and 2. The ramp arm 139, and thus the actuator assembly 110, stay in the parked position while the disc drive 100 is not in operation.

The snubber 200 is attached to the base plate 102 adjacent to an opposite end 154 of the load ramp 150 from end 152. Alternatively, the snubber 200 may be formed integrally with the load ramp 150 which would save manufacturing costs by reducing the number of separate parts in the disc drive 100. However, the snubber 200 does not need to be attached to base plate 102, but may be attached to any other stationary disc drive component, such as, the load ramp 150.

The snubber body has an inner wall 204 facing disc 108, and outer wall 206 opposite to the inner wall 204, an inner end 208 facing the actuator body 113, and an outer end 210 opposite of the inner end 208. The snubber arms 216 are formed integrally with the inner wall 204 at a point adjacent to the inner end 208.

As shown in FIG. 1, each snubber arm 216 is flat piece of rigid material having a generally square shape. However, the snubber arms 216 may be formed in any shape, such as a half circle, a triangle, or a combination of shapes. Each snubber arm 216 has an end 222, two opposite sides 218 and 220 that connect the end 222 to the inner wall 204, and opposite surfaces 224. Preferably, the distance between the inner wall 204 of the snubber body 202 and the end 222 of the snubber arm 216 is greater than or equal to the width of the actuator arm 114 at the point where it attaches to the flexure 116.

As best seen in FIG. 2, the snubber arms 216 are stacked in linear alignment with a plane which is perpendicular to the plane of the disc 108 and every two adjacent snubber arms 216 form a slot 230 therebetween. The slots 230 are adapted to receive one or more actuator arms 114 and/or flexures 116 when the actuator assembly 110 is parked on the load ramp 150. Another slot 230 is formed between one snubber arm 216 and the base plate 102 and is adapted to receive the actuator arm 114 that reads from and writes to a surface of disc 108 adjacent to the base plate 102. Alternatively, the snubber 200 may have an additional snubber arm 216 which fits flush against the base plate 102.

FIG. 2 shows snubber 200 installed in a disc drive with two discs 108. Snubber 200 has three snubber arms 217, 219, and 221 that form slots 231 and 233. Snubber arm 221 and the base plate 102 form a slot 235 (not shown). Slot 233 is larger than slots 231 and 235 because it is adapted to receive two actuator arms 114. However, snubber 200 is not limited to three snubber arms 216 and may have more or less snubber arms 216 depending upon the number of actuator arms 114 in the disc drive 100. So for example, in a disc drive with four discs 108, snubber 200 would have either five or six snubber arms 216 depending on whether or not there is a snubber arm 216 flush with the base plate 102.

The snubber 200 is mounted to the base plate 102 via screw 214 through the snubber body 202. The length of the snubber body, defined by the distance between the outer end 208 and the inner end 210, will depend upon the following factors: the location where the snubber 200 is mounted to the base plate 102, the size of the snubber arms 216, and the part of the actuator assembly 110 that needs to be snubbed.

When a mechanical shock event occurs and causes deflection or vibration of the actuator assembly 110, the actuator assembly 110 will make contact with the surfaces 224 of the snubber arms 216 which, in turn, will limit the deflective movement of the actuator assembly 110. Preferably, the snubber arms 216 are positioned to cover at least a portion of the actuator arms 114 and a portion of the flexures 116 when the actuator assembly 110 is parked. In this way, the snubber arms 216 will limit the deflective movement of the actuator arms 114 and the flexures 116 during a mechanical shock event. By limiting the deflective movement of the actuator assembly 110, the chances that the gimbal insert 142 will become permanently separated from the load beam 134 are greatly reduced. Additionally, limiting deflective movement of the actuator assembly 110 will cause the following benefits: preventing the ramp arm 139 from pulling out the load ramp 150 while the actuator assembly 110 is parked, reducing the strain on the flexures 116 and thereby protecting a spring force on the flexure 116 which helps maintain the flying height during disc drive 100 operation, and reducing the strain on many of the drive components, such as, electrical traces along the actuator assembly 110.

Figure 3:
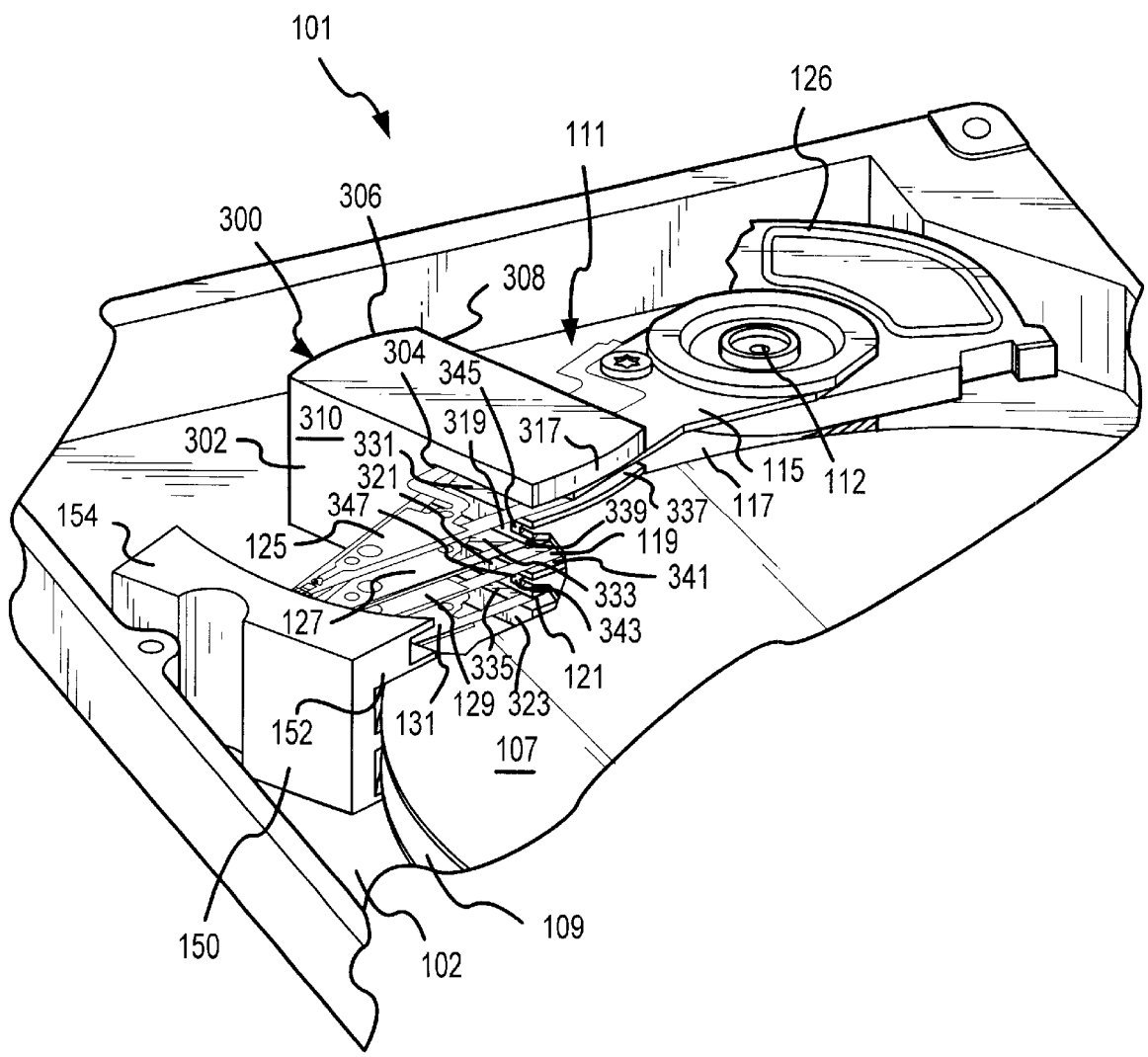
FIG. 3 shows a top partial perspective view of another preferred embodiment of the present invention.

FIG. 3 shows another preferred embodiment of the present invention having a modified snubber 300 used in connection with a disc drive 101 having two discs 107 and 109 and an actuator assembly 111 with four actuator arms 115, 117, 119, and 121 and four flexures 125, 127, 129, and 131.

Similar to first preferred embodiment of the present invention, snubber 300 is formed from a rigid material preferably with damping properties, such a plastic or rubber, but may also include non-damping materials such as metal. Snubber 300 includes a snubber body 302 and four snubber arms 317, 319, 321, and 323. Likewise, the number of snubber arms 316 will depend upon the number of actuator arms 114 in the disc drive 100, and may have any number of snubber arms 316. The snubber body 302 has an inner wall 304 facing the disc 108, and outer wall 306 opposite to the inner wall 304, an inner end 308 facing the actuator body 113, and an outer end 310 opposite of the inner end 308. The snubber arms 317, 319, 321, and 323 are flat, square-shaped pieces of rigid material. The snubber arms 317, 319, 321, and 323 are formed integrally with the inner wall 304 and extend the entire length of inner wall 304. Snubber arms 317 and 319 from slot 331. Snubber arms 319 and 321 form slot 333. Snubber arm 321 and the 323 form slot 335.

Slot 331 is adapted for insertion of the actuator arm 115 and the flexure 125. Slot 333 is adapted for insertion of the actuator arms 117 and 119 and the flexures 127 and 129. Slot 335 is adapted for insertion of the actuator arm 121 and the flexure 131. Snubber arms 317, 319, 321, and 323 partially cover the actuator arms 115, 117, 119, and 121 and the flexures 125, 127, 129, and 131.

Snubber 300 additionally has secondary snubber arms 337, 339, 341, and 343 formed within snubber arms 319 and 321. The secondary snubber arms 337 and 339 form a secondary slot 345 and the secondary snubber arms 341 and 343 form another secondary slot 347. A portion of an outer diameter of the disc 107 is inserted into the secondary slot 345 and a portion of the outer diameter of disc 109 is inserted into the secondary slot 347 irregardless of the position of the actuator assembly 111. In this way, the snubber 300 additionally reduces deflective movement of the discs 107 and 109 during a mechanical shock event via the secondary snubber arms 337, 339, 341, and 343.

As the actuator assembly 111 pivots towards the outer diameter of the discs 107 and 109, the actuator arms 115, 117, 119, and 121 and the flexures 125, 127, 129, and 131 will be inserted into the slots 331, 333, and 335 as described above. In this way, the snubber arms 317, 319, 321, 323 will limit the deflection of actuator arms 115, 117, 119, and 121 and the flexures 125, 127, 129, and 131 by providing a barrier against deflective movement of the actuator assembly 111.

Figure 4:
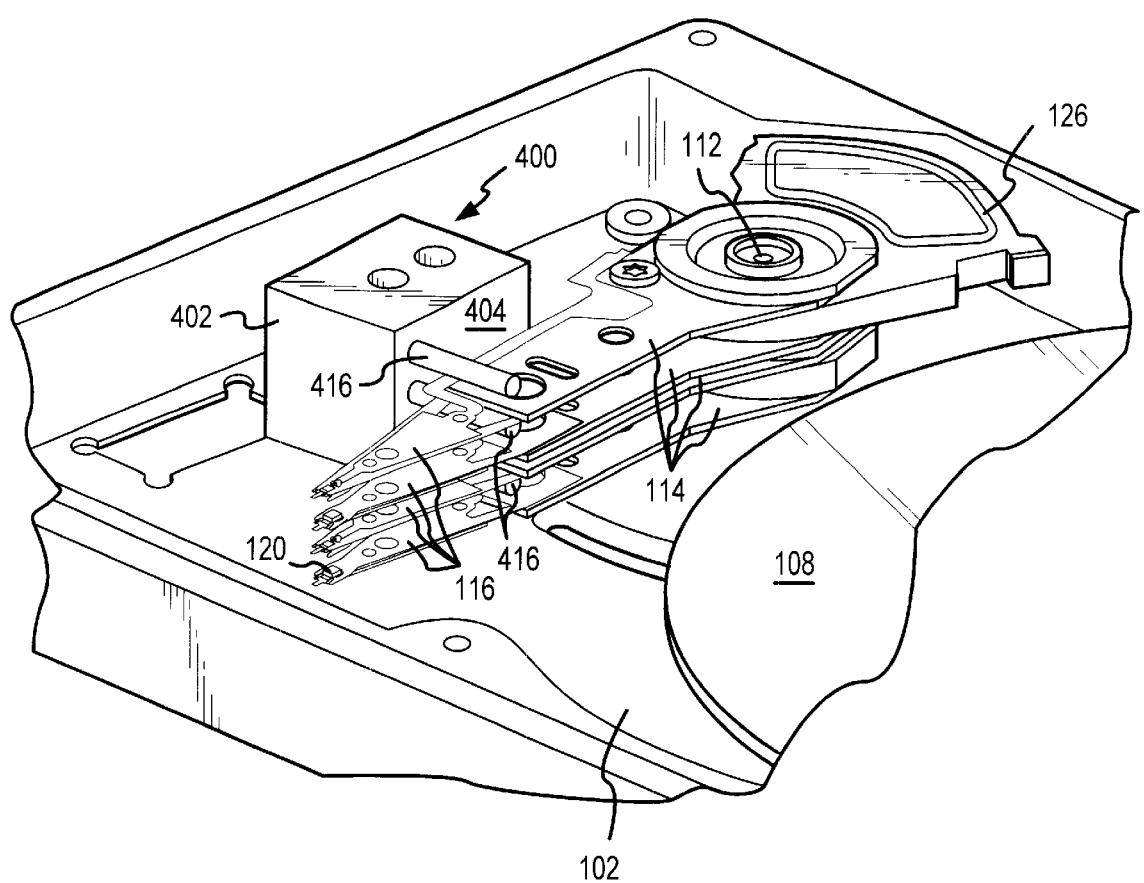
FIG. 4 is a top partial perspective view of yet another preferred embodiment of the present invention.

FIG. 4 shows another preferred embodiment of the present invention having a modified snubber 400. Instead of having flat snubber arms, the snubber 400 has one or more pins 416 attached to an inner wall 404 of a snubber body 402. The pins 416 can be made of metal or plastic or some other type of rigid material. Similar to the other preferred embodiments, the number of pins 416 will depend upon the number of discs 108 in the disc drive 100. Likewise snubber 400 is mounted onto the base plate 102. The snubber pins 416 may be positioned at any point along either the actuator arm 114 or the flexure 116. Alternatively, the snubber 400 could have pins 416 positioned along the actuator arm 114 and an additional set of pins 416 positioned along the flexure 116.

In summary, one exemplary embodiment of the present invention as an apparatus reduces deflection of an actuator assembly (such as 110 or 111) within a head disc assembly in a disc drive (such as 100 or 101) during a mechanical shock event. The head disc assembly has the base plate (such as 102) and the top cover (such as 104) which encloses the drive motor (such as 106) and the actuator assembly (such as 110 or 111). The drive motor (such as 106) supports the disc (such as 107, 108, or 109) which spins at a given velocity during disc drive operation.

The actuator assembly (such as 110 or 111) has the actuator arm (such as 114, 115, 117, 119, or 121) attached to one end of the flexure (such as 116, 125, 127, 129, or 131), and the slider or read/write head (such as 120) attached proximate to the opposite end of the flexure (such as 116, 125, 127, 129, or 131).

The snubber (such as 200, 300, or 400), located within the head disc assembly, has the snubber body (such as 202, 302, or 402) and two or more snubber arms (such as 216, 217, 219, 221, 316, 317, 319, 321, 323, or 416) connected to the snubber body (such as 202, 302, or 402) wherein the adjacent snubber arms (such as 216, 217, 219, 221, 316, 317, 319, 321, 323, or 416) form a plurality of slots (such as 230, 231, 233, 235, 330, 331, 333, 335, or 430) therebetween. The snubber arms (such as 216, 217, 219, 221, 316, 317, 319, 321, 323, or 416) are stacked in linear alignment with the plane perpendicular to the plane of the disc (such as 107, 108, or 109). An additional slot (such as 235) may be formed between the base plate (such as 102) and the snubber arm (such as 221) adjacent to the base plate (such as 102).

A portion of the actuator assembly (such as 110, 111, 114, 115, 117, 119, 121, 116, 125, 127, 129, or 131) is located within the slots (such as 230, 231, 233, 235, 330, 331, 333, 335, or 430) when the actuator assembly (such as 110 or 111) is parked whereby deflection of the actuator assembly (such as 110 or 111) is reduced during a mechanical shock event. The actuator assembly (such as 110 or 111) may have a plurality of actuator arms (such as 114, 115, 117, 119, or 121) and a portion of each actuator arm (such as 114, 115, 117, 119, or 121) may be located within one of the slots (such as 230, 231, 233, 235, 330, 331, 333, 335, or 430).

The snubber arms (such as 216, 217, 219, 221, 316, 317, 319, 321, 323, or 416) may be formed integrally with the snubber body (such as 202, 302, or 402) or may be attached to the snubber body (such as 202, 302, or 402). The snubber arms (such as 216, 217, 219, 221, 316, 317, 319, 321, 323, or 416) may be a flat piece of rigid material (such as 216, 217, 219, 221, 316, 317, 319, 321, and 323) or a pin (such as 416).

The snubber (such as 200, 300, or 400) may additionally have secondary snubber arms (such as 337, 339, 341, and 343) formed within snubber arms (such as 216, 217, 219, 221, 316, 317, 319, 321, 323, or 416). The adjacent secondary snubber arms (such as 337, 339, 341, and 343) form the secondary slot (such as 345 or 347) therebetween within one or more of the snubber arms (such as 216, 217, 219, 221, 316, 317, 319, 321, 323, or 416). A portion of the outer diameter of the disc (such as 107, 108, or 109) is inserted into the secondary slot (such as 345 or 347). In this way, the secondary snubber arms (such as 337, 339, 341, and 343)

allow the snubber (such as 300) to additionally reduce deflective movement of the discs (such as 107, 108, or 109) during a mechanical shock event.

Another exemplary embodiment of the invention is a method for reducing deflection of an actuator assembly (such as 110 or 111) within a head disc assembly in a disc drive (such as 100 or 101) during a mechanical shock event is as follows. The snubber (such as 200, 300, or 400) is provided to the disc drive (such as 100 or 101) proximate to an outer diameter of a disc (such as 107, 108, or 109). The actuator assembly (such as 110 or 111) is pivoted towards the outer diameter of the disc (such as 107, 108, or 109). And a portion of the actuator assembly (such as 110 or 111) is inserted into each of the slots (such as 230, 231, 233, 235, 330, 331, 333, 335, or 430) between the snubber arms (such as 216, 217, 219, 221, 316, 317, 319, 321, or 416) wherein deflection of the actuator assembly (such as 110 or 111) is reduced during a mechanical shock event.

In the method, a portion of the actuator arm (such as 114, 115, 117, 119, or 121) may be inserted into each of the slots (such as 230, 231, 233, 235, 330, 331, 333, 335, or 430). Or a portion of a flexure (such as 116, 125, 127, 129, or 131) may be inserted into each of the slots (such as 230, 231, 233, 235, 330, 331, 333, 335, or 430). Or a portion of the actuator assembly (such as 110 or 111) where the flexure (such as 116, 125, 127, 129, or 131) attaches to the actuator arm (such as 114, 115, 117, 119, or 121) may be inserted into each of the slots (such as 230, 231, 233, 235, 330, 331, 333, 335, or 430). The snubber (such as 200, 300, or 400) may be affixed to a load ramp (such as 150) within the disc drive (such as 100 or 101) or may be formed integrally with the load ramp (such as 150) within the disc drive (such as 100 or 101). Or the snubber (such as 200, 300, or 400) may be fastened to any other stationary portion of the head disc assembly.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art. For example, the snubber body and the snubber arms may be of any shape that will sufficiently cover any portion of the actuator assembly to reduce deflection during a mechanical shock event. Also, the snubber may be located at any position within the disc drive so as to make contact with any portion of the actuator assembly. Accordingly, all such modifications, changes and alternatives are encompassed in the spirit of the invention disclosed and as defined in the appended claims.

What is claimed is:

1. A snubber for reducing deflection of an actuator assembly within a head disc assembly in a disc drive during a mechanical shock event, the actuator assembly having an actuator arm attached to one end of a flexure, a slider attached proximate to an opposite end of the flexure, and a load ramp for parking the actuator assembly outside of an outer diameter of a disc, the snubber comprising:
   a snubber body fastened to a stationary portion of the head disc assembly;
   two snubber arms connected to the snubber body wherein each of the snubber arms is a pin and the snubber arms form a slot therebetween for receiving a portion of the actuator assembly spaced from the opposite end of the flexure and the slider within the slot when the actuator assembly is parked on the load ramp beyond the outside diameter of the disc, wherein the snubber arms contact the portion of the actuator assembly during a shock event and reduce deflection of the actuator assembly.

2. The snubber of claim 1 wherein the portion of the actuator assembly comprises a portion of the actuator arm.

3. The snubber of claim 2 further comprising more than two snubber arms and a slot is formed between adjacent snubber arms so that there are a plurality of slots.

4. The apparatus of claim 3 further comprising two secondary snubber arms forming a secondary slot therebetween and a portion of the disc is located within the secondary slot.

5. The snubber of claim 2 wherein the actuator assembly has a plurality of actuator arms and a portion of each actuator arm is located within one of the slots.

6. The snubber of claim 1 wherein the portion of the actuator assembly comprises a portion of the actuator arm and a portion of the flexure.

7. The snubber of claim 1 wherein the portion of the actuator assembly comprises a portion of the flexure.

8. The apparatus of claim 1 wherein a portion of the snubber arm covers a portion of a disc within the disc drive.

9. The snubber of claim 1 wherein each of the snubber arms is formed integrally with the snubber body.

10. The snubber of claim 1 wherein each of the snubber arms is attached to the snubber body.

11. A disc drive comprising:
    a head disc assembly having a base plate and a top cover enclosing a drive motor supporting a disc thereon and an actuator assembly;
    the actuator assembly having an actuator arm, a flexure having one end connected to the actuator arm and a gimbal insert connected proximate to an opposite end of the flexure, the gimbal insert supporting a read/write head; and
    a snubber having a snubber body and two snubber arms connected to the snubber body wherein the snubber body is mounted to the base plate outside of an outer diameter of a disc and wherein each of the snubber arms is a pin and the snubber arms form a slot therebetween for receiving a portion of the actuator assembly spaced from the opposite end of the flexure away from the gimbal insert when the actuator arm is positioned beyond an outer diameter of the disc, wherein the snubber arms contact the portion of the actuator assembly to reduce deflection of the actuator assembly during a mechanical shock event.

12. The disc drive according to claim 11 wherein an additional slot is formed between the base plate and a snubber arm adjacent to the base plate.

13. The apparatus of claim 11 further including one or more additional snubber arms forming one or more additional slots.

14. An apparatus for reducing damage to a disc drive caused by a mechanical shock event, the apparatus comprising:
    a disc drive assembly having a drive motor which supports a disc thereon, an actuator assembly having an actuator arm, a flexure having one end connected to a gimbal insert supporting a slider and an opposite end connected to the actuator arm, and a load ramp for parking the actuator assembly beyond an outer diameter of the disc; and
    means spaced from the one end supporting the gimbal insert and the slider fastened to a stationary portion of the head disc assembly for limiting deflection of the actuator assembly when the actuator assembly is parked on the load ramp during a mechanical shock event.

* * * * *

UNITED STATES PATENT AND TRADEMARK OFFICE
CERTIFICATE OF CORRECTION

PATENT NO.     : 6,473,270 B1
DATED          : October 29, 2002
INVENTOR(S)    : McDonald et al.

It is certified that error appears in the above-identified patent and that said Letters Patent is hereby corrected as shown below:

<u>Title page,</u>
Item [73], Assignee, delete "Seagate Technologies LLC" and insert therefore
-- Seagate Technology LLC --

Signed and Sealed this

Eighth Day of April, 2003

JAMES E. ROGAN
*Director of the United States Patent and Trademark Office*